United States Patent Office 3,507,897
Patented Apr. 21, 1970

1

3,507,897
NOVEL SILICON SULFONATE COMPOSITIONS
AND NOVEL PROCESSES FOR MAKING SAME
Bernard Kanner, Williamsville, N.Y., and Roscoe A. Pike,
Holden, Mass., assignors to Union Carbide Corporation,
a corporation of New York
No Drawing. Filed July 18, 1966, Ser. No. 565,745
Int. Cl. C07f 7/02; B01f 17/54
U.S. Cl. 260—448.2       19 Claims

ABSTRACT OF THE DISCLOSURE

Process for making novel silicon sulfonate compositions by reacting, in the presence of a catalytic amount of a sulfite salt, a bisulfite salt having a cation selected from the class consisting of monovalent, divalent and trivalent metal cations, ammonium cation and tetraalkylammonium cations with an epoxy silicon compound having in an amount of 0.1 to 100 mole percent an epoxy silicon unit of the formula:

(I)

wherein E' is a monovalent group having 3 to 18 carbon atoms selected from the class consisting of epoxyalkyl, epoxycycloalkyl, epoxyalkoxyalkyl and epoxycycloalkoxyalkyl groups, R' is a monovalent group from the class consisting of alkyl, cycloalkyl, aryl, alkaryl, aralkyl, alkenyl and cycloalkenyl groups and halogen-, alkoxy-, aryloxy- and cyano-substituted derivatives thereof, and $a$ is an integer of 0 to 2 inclusive, and in an amount of 0.0 to 99.9 mole percent of a unit of the formula:

(II)

wherein R" is a monovalent group selected from the class consisting of hydrogen and a group from the class consisting of groups from which R' is selected and $b$ is an integer of 1 to 3 inclusive; to form said novel silicon sulfonate having in an amount of 0.1 to 100 mole percent the silicon sulfonate unit for the formula:

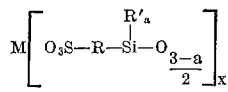

wherein M is said cation of said bisulfite, R is a hydroxy-substituted divalent group having 3 to 18 carbon atoms selected from the class consisting of alkylene, cycloalkylene, alkyleneoxyalkylene, and cycloalkyleneoxyalkylene groups and said hydroxy substituent is bonded to a carbon atom vicinal to the carbon atom to which the —O₃S— group is bonded, R' is defined above, $a$ is defined above and $x$ is an integer of 1 to 3 inclusive equal to the valency of said cation and in an amount of 0.0 to 99.9 mole percent a unit having the Formula II.

The novel silicon sulfonate compositions have shown excellent properties as surface active agents in both aqueous and organic media. Solvent compositions containing the novel silicon sulfonate compositions are useful as emulsifying agents and surface active materials having unexpectedly low levels of surface tension and are useful in the production of emulsions for use in making polishes, treating baths for treating paper and textiles, foaming media and the like.

This invention relates to novel compositions of matter and to novel processes for preparing them. More particularly, the novel processes of this invention involve the reaction of an epoxy silicon compound and a bisulfite salt using an inorganic sulfite salt as a catalyst to form silicon sulfonates. This reaction is generally depicted by the following equation:

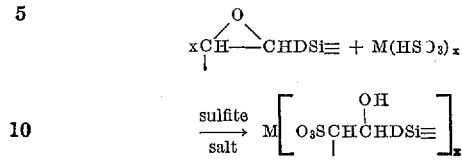

wherein M is a monovalent, divalent, or trivalent cation, $x$ is 1 or 2 or 3 and equal to the valence of M, D is a divalent organic group or a trivalent organic group when combined with the free valence shown for one oxirane carbon atom and said free valence, when not combined with D, is bonded to a monovalent organic group. A wire range of polymeric products can be prepared by this process including compositions having excellent surfactant properties in aqueous and/or non-aqueous media.

The present invention is based, in part, upon the discovery that silicon sulfonate compositions can be obtained in high yields by the reaction of epoxy, or more specifically glycidoxy, silicon compositions with a bisulfite salt in the presence of relatively minor amounts of a sulfite salt. The present invention is also based, in part, on the discovery of novel silicon sulfonate compositions, not heretofore available, resulting from the above-mentioned reaction. In addition, the present invention is based, in part, on the discovery of unexpectedly high surfactant characteristics, in aqueous as well as non-aqueous media, of various silicon sulfonate compositions resulting from this invention. These silicon sulfonate compositions are well suited for use with aqueous and non-aqueous solvents for the production of emulsions for polishes and the like, for treating baths having increased wetting properties useful in the paper and textile industries, for use as foaming media, and for many other uses as media having low surface tension, wetting properties, prefoaming properties and/or emulsifying properties.

The novel compositions of matter that are prepared by the novel processes of this invention include both homopolymers and copolymers. These new compositions of matter contain units represented by the following formula:

(I) 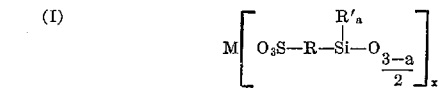

wherein M is a monovalent metal cation such as sodium, potassium, lithium, cesium, a monovalent cation such as ammonium or tetralkyl ammonium wherein the alkyl groups contain one to 18 carbon atoms and the like, a divalent metal cation such as barium, calcium, strontium, zinc, cadmium, magnesium, iron, cobalt, nickel, copper, tin, lead, mercury and the like, or a trivalent metal cation, such as, aluminum, nickel, tin and the like, and preferably is an inorganic cation; R' is an alkyl or cycloaliphatic group such as methyl, ethyl, propyl, cyclopentyl, butyl, amyl, octyl, cyclohexyl, isopropyl, tert-butyl, isooctyl and the like, an aryl group such as phenyl, biphenyl, naphthyl and the like, a substituted aryl group, e.g., alkyl-substituted, halogen-substituted, alkoxy-substituted and aryloxy-substituted aryl groups, such as tolyl, chlorophenyl, trifluoromethylphenyl, phenoxyphenyl, chloronaphthyl, anisyl and the like, an aralkyl group such as benzyl, beta-phenylethyl, beta-phenylpropyl and the like a substituted aralkyl group, e.g., alkyl-substituted, halogen-substituted, alkoxy-substituted and aryloxy-substituted aralkyl groups, such as chlorobenzyl, beta-anisylethyl, beta-phenoxynaphthylpropyl and the like, a substituted alkyl group, e.g., halogen-substituted, alkoxy-substituted, cyano-substituted and aryloxy-substituted alkyl groups, such as gamma-chloropropyl, 3,3,3-trifluoropropyl, beta-cyanoethyl, gamma-methoxypropyl, and alkyl groups substituted with other functional groups which do not contain an active hydrogen, an olefinic hydrocarbon group, e.g., alkenyl and cycloalkenyl groups, such as vinyl, allyl, 2-butenyl, cyclohexenyl, and the like; R' may be the same or different in each molecule of said novel compositions and can have one to 18 carbon atoms; R is a hydroxy-substituted linear or cycloaliphatic alkylene group, alkyleneoxyalkylene group or cycloalkyleneoxyalkylene group consisting of three to 18 carbon atoms with the hydroxyl group attached to a carbon atom vicinal to the carbon atom to which the metal sulfonate group is attached, such as, hydroxy-substituted alkyleneoxyalkylene,

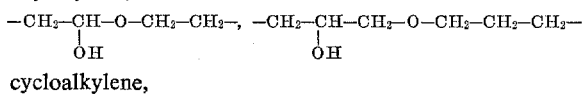

cycloalkylene,

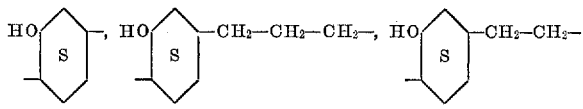

alkylene,

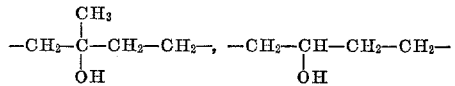

and cycloalkyleneoxyalkylene,

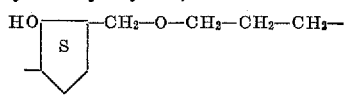

and the like; $a$ is an integer having a value of from zero to two, and $x$ is an integer having a value of from 1 to 3 equal to the valency of the cation M.

A preferred embodiment of this invention relates to siloxanes containing from 0.1 to 100.0 mole percent of the units of the Formula I above and from 0.0 to 99.9 mole percent of units of the formula:

(II) $$R''_b SiO_{\frac{4-b}{2}}$$

wherein R'' is as defined above for R' and can be the same or different in each molecule and $b$ is an integer having an average value of from 1 to 3 inclusive. The copolymers falling in this description preferably contain 10 to 75 mole percent of units of Formula I and 25 to 90 mole percent of units of Formula II and can be prepared by well known cohydrolysis processes or preferably by the reaction of epoxysilicon copolymers in accordance with the processes of this invention. The copolymers of this invention can contain any one or combination of more than one of the following types of groups: $R''_2SiO$, $R''SiO_{3/2}$, $R''_3SiO_{1/2}$ and limited amounts of $SiO_2$.

Preferred copolymers are those wherein M is sodium, potassium, ammonium, tetralkyl ammonium, barium, calcium, strontium or magnesium. Especially preferred are those copolymers wherein M is sodium, potassium, ammonium or tetralkyl ammonium.

The reactions involved in producing the novel silicon sulfonates can be explained by the equations wherein sodium sulfite and sodium bisulfite are used:

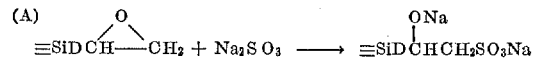

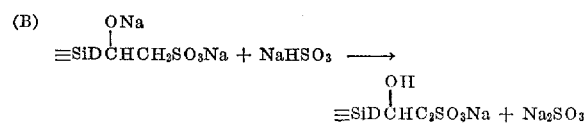

In the above equations, the sodium sulfite first reacts with the epoxysilicon composition to form an intermediate that is strongly basic because of the $\equiv$CONa group. This intermediate substantially immediately reacts with the sodium bisulfite to form the desired silicon sulfonate and regenerate the sodium sulfite. The next result is that the epoxy silicon composition and sodium bisulfite are reacted to form the silicon sulfonate and the sodium sulfite appears in the final product in about the same quantities as originally introduced. While the sodium sulfite may be a true coreactant, it can be, and is herein, called a catalyst, since it is present before and after the reaction in substantially unchanged concentration and its presence accelerates the reaction.

In general, the most convenient mode of carrying out the processes of this invention is to use as a starting material the epoxy silicon composition corresponding in siloxane structure to the siloxane structure of the desired silicon sulfonate composition. As there is no change in the siloxane structure of siloxane backbone the desired final product is obtained directly.

The expoxy silicon compositions that may be used in this process can be prepared in accordance with well known procedures, e.g., by the catalyzed reaction of SiH-containing siloxanes with olefinically unsaturated epoxides or by the epoxidation of olefinic silicone polymers. Such epoxy silicon compositions are characterized by having at least one unit of the formula:

(III) 

wherein E' is a monovalent group having 3 to 18 carbon atoms selected from the class consisting of epoxyalkyl, e.g., 3,4-epoxybutyl, 2,3-epoxypropyl, and 3,4-epoxy-3-methylbutyl; epoxyalkoxyalkyl, e.g., glycidoxypropyl, 3,4-epoxybutoxybutyl and 1,2-epoxyethoxyethyl; epoxycycloalkyl, e.g., beta-3,4-epoxycyclohexylethyl, 3,4-epoxycyclohexyl, gamma-3,4-epoxycyclohexylpropyl, 2,3-epoxycyclopentylmethyl, 2,3-epoxycyclobutyl and the like; and epoxycycloalkoxyalkyl, e.g., 2,3-epoxycyclopentyloxypropyl, 2,3 - epoxycyclopentyloxyethyl, 3,4 - epoxycyclohexylethyl, 3,4-epoxycyclohexylmethoxyethyl, 2,3-epoxycyclopentylmethoxypropyl, and the like; and R' and $a$ are as defined above.

Of particular preference in the novel processes of this invention is the use as starting material of epoxy silicon compositions of the Formula III given above in which E' is a glycidoxyalkyl group, e.g., glycidoxy-n-propyl, because of the greater readiness by which such compounds react to produce the corresponding silicon sulfonate composition of Formula I wherein R is a propyleneoxyalkylene group. Epoxy silicon compositions useful as starting materials herein and methods for making them are described in Canadian Patent No. 580,908.

The bisulfite salts that are coreactants in this invention can vary widely in composition. Preferred bisulfite reactants include the alkali metal salts such as sodium, potassium, lithium, cesium and rubidium bisulfites and ammonium or substituted ammonium bisulfites. Also included are the bisulfites of the alkaline earth metals such as magnesium, calcium, barium and strontium.

The sulfite salts which are catalytic in the processes of this invention can also vary widely in composition. Generally, sulfite salts having the same cations as described above for the sulfite salts may be used as the sulfite catalyst. The preferred catalysts are the alkali and alkaline earth sulfites since these are the most basic of the sulfite salts.

The novel silicon sulfonates containing units of Formula I wherein M is a metal cation such as tin, zinc, cadmium, lead, nickel, cobalt, copper, mercury and aluminum are suitably prepared by reacting the chloride of the metal, e.g., $MCl_x$ where $x$ is the valence of the metal, with the corresponding silicon sulfonate wherein M is sodium, potassium, ammonium, calcium, barium, etc. Thus, when it is desired to prepare

[Me₃SiO)₂MeSiC₃H₆OCH₂CHCH₂SO₃]₂Cu cupric chloride is reacted with

employing amounts of cupric chloride in excess of the stoichiometric amount needed for converting the sodium silicon sulfonate to the cupric silicon sulfonate. Suitable metal chlorides include cuprous chloride, stannous chloride, zinc chloride, cadmium chloride, cobaltous chloride, lead chloride, nickel chloride, mercuric chloride, mercurous chloride, aluminum chloride, cupric chloride, stannic chloride and the like. Cation interchange reactions such as that just described are used to produce silicon sulfonates having cations which in sulfite or bisulfite form are difficult to react with the epoxy group of the starting epoxy silicon compound. When a sodium silicon sulfonate is used in the metathesis NaCl is produced. The reaction medium should be chosen such that NaCl is insoluble whereas the reactants and new silicon sulfonate product are soluble. Hydrocarbon solvents, ethers and other organic solvents, e.g., toluene and ether, dissolve the silicon sulfonates and many chlorides but not sodium chloride and thus are suitable as media in the metathesis. The metathesis reaction can be used also to convert novel silicon sulfonates having one kind of cation to novel silicon sulfonates having a different kind of cation or to produce novel silicon sulfonates having more than one kind of cation per molecule, i.e., the mixed salts, by converting some but not all of the cations of the starting silicon sulfonate to a different kind of cation.

The processes of this invention are aided by carrying out the reaction under homogeneous conditions. Because the ionic salts and nonionic epoxy silicon composition used as starting materials are mutually incompatible, the use of a highly polar solvent or mixture of solvents is very desirable. A combination of water and completely water miscible alcohols, such as, methanol, ethanol and isopropanol, is a preferred reaction medium. Other highly water soluble solvents, such as, tetrahydrofuran, ethylene glycol, the methyl and ethyl ethers of ethylene glycol and polyethylene glycols, acetamide, dimethylacetamide, formamide, diethylformamide and other water soluble solvents, can also be used. Generally, it is preferred to strike a balance between the conflicting requirements of complete homogeneity and the use of reasonable solvent concentrations. In such cases, the reaction mixture is not completely homogeneous initially but becomes homogeneous as the reaction proceeds. The ratio of solvent to reactants may range from 10:1 to 0.5:1 on a weight basis.

The reaction temperature will depend on the reactivity of the particular starting materials and catalyst and the particular solvents used. Generally, the preferred temperatures range from 50–150° C. In some cases, temperatures as high as 200° C. or as low as 25° C. can be used. The temperature and, consequently, the rate of reaction can be increased, if desired, by employing super-atmospheric pressures, for example, by conducting the reaction in an autoclave.

It has been found that the novel silicon sulfonates provided herein are subject to degradation with loss of surfactant properties when the aqueous pH thereof is appreciably outside the range of 5 or 6 to 8. Consequently, it is desirable when water is present to carry out the reaction under such conditions that the pH is not appreciably lower than 5, and preferably not lower than 6, and is not appreciably higher than 8. This can be accomplished by the use of non-reactive buffers of any suitable type or it can be accomplished by selection of the amounts of sulfite and bisulfite used which functions as a natural buffer in the reaction system.

In a convenient mode of carrying out the novel process, the total sulfite and bisulfite concentration should be in excess of the concentration of the epoxy silicon composition used. This is to ensure (a) complete conversion to product of the relatively more expensive epoxy silicon composition and (b) the maintenance of mild pH conditions corresponding to a range of 5 or 6 to 8 in water. The natural buffering action of the sulfite-bisulfite mixture is readily effected by using a 10 to 100% excess of total sulfite-bisulfite mixture and an amount of sulfite which is less than said excess. This ensures that a mixture of bisulfite and sulfite will remain after completion of the reaction. When the molar ratio of bisulfite to sulfite, remaining after reaction, falls into the approximate range of 10:1 to 1:10, the natural buffering action exerts its influence to maintain the pH in the approximate range of 5.5 to 7.5. The following table illustrates systems in which natural buffering is provided:

| Epoxy silicon (moles of oxirane) | NaHSO₃ (moles) | Na₂SO₃ (moles) | Percent excess salts | SO₃H/SO₃ |
|---|---|---|---|---|
| 1.0 | 1.05 | 0.15 | 20 | 1:3 |
| 1.0 | 1.40 | 0.10 | 50 | 4:1 |
| 1.0 | 1.05 | 0.05 | 10 | 1:1 |

As long as the bisulfite to sulfite mole ratio at the end of the reaction falls in the approximate range of 10:1 to 1:10 natural buffering is obtained.

In systems of this type the reaction rate is roughly dependent on the sulfite ion concentration, that is, the higher the sulfite ion concentration the faster the reaction rate, in general. In those non-homogeneous systems described herein the reaction rate is not overly dependent upon the concentrations of reactants simply because such systems are not entirely homogeneous.

When reaction systems herein are buffered by other buffers, the relative amounts of reactants employed also are not narrowly critical and can be varied over a wide range. While it is preferred for economy to employ an excess of sulfite and bisulfite over epoxy silicon composition, an excess of epoxy silicon composition can be used if desired or for special purposes. Illustratively, the mole ratio of oxirane rings to bisulfite can range from 0.25 to 2.0–1, preferably 0.9 to 1.1:1 and the amount of sulfite used can range from 0.1 to 100% based on the weight of bisulfite.

Reaction time is dependent in large part on the selection of the other parameters already described hereinabove. From considerations of practicality the reaction parameters of stoichiometry, solvent concentration, catalyst concentration and temperature should be chosen so that reaction time falls in the range of one to eight hours. Longer or shorter reaction times can be employed, if desired.

The discovery of pH sensitivity of silicon sulfonates described herein provides an explanation of the undesirability of using sodium sulfite alone as the sulfonating agent. Such use of sodium sulfite alone requires the presence of water to convert the ≡CONa groups to ≡COH groups. This conversion also releases sodium hydroxide which raises the pH of the system unduly and causes degradation. A buffered system results, however, when a bisulfite is used in conjunction with minor amounts of a sulfite, thus providing a stable system during and after reaction.

In line with controlling pH during reaction, it is preferred to exclude oxygen by means of nitrogen or other inert gas in the reaction vessel. The exclusion of oxygen prevents undesired oxidation of sulfite and bisulfite to corresponding sulfate and bisulfate and thus assists in maintaining proper pH conditions.

After completion of the reaction, the novel silicon sulfonate can be isolated and separated from the reaction mixture as a solid or liquid as the case may be. Alternatively, the reaction medium can be employed as it is in the desired end use, or after concentration by removal of some solvent. When the novel silicon sulfonates are employed in aqueous systems it is preferred to maintain such systems at a pH of at least about 5, preferably 6 and not more than about 8. This is accomplished by permitting the sulfite and bisulfite to remain with the silicon sulfonate to effect the natural buffering system as explained above or it can be accomplished by adding additional sulfite and bisulfite or any other buffer which will not degrade the silicon sulfonate or otherwise reduce its surfactant capabilities.

The silicon sulfonate compositions of this invention have shown excellent properties as surface active agents in both aqueous and organic media. In either media these composition exhibit excellent surface tension lowering ability, activity as emulsifying agents, and profoaming and wetting properties. Consequently, these silicon sulfonate compositions are useful as emulsifying agents for the production of polishes, wetting agents for use in the paper and textile industries, foaming agents, and surface active materials in organic media for use in the dry cleaning industry.

When mixed with commonly used solvents, including water or the organic non-aqueous solvents, such as, benzene, toluene, xylene, chloroform, ethylacetate, tetrahydrofuran, dimethylformamide, dimethylacetamide, naphtha, perchloroethylene, trichloroethylene, ethylene chloride, acetone, ethanol, pine oil, butyl Cellosolve, dichloroethyl ether and the like, the novel silicon sulfonate materials made by this invention form novel solvent compositions characterized by unexpectedly low levels of surface tension. The amount of silicon sulfonate material in the solvent need only be as little as 0.001 percent based on the weight of solvent in order to effectively lower the surface tension of the solvent and can be as high as 20 percent on the same weight basis. Preferably, the amount of the silicon sulfonate material should not exceed its solubility in the solvent although amounts above the soluble amount can be employed, if desired. In the usual case, amounts in the range of 0.001 to 1 percent based on the weight of solvent are sufficient to produce the surface tension lowering effects desired.

The novel solvent compositions of this invention are useful in the production of emulsions for use in making polishes for floors, automobiles, furniture and other objects; of treating baths of increased wetting properties for use in treating paper and textiles; of foaming media, and of media having lowered surface tension, wetting properties, profoaming properties, emulsifying properties and/or, in general, increased surface activity, for uses in which such characteristics are important.

The following examples are presented. In the examples and elsewhere, the symbol Me means methyl, parts and percentages are on a weight basis and temperature is on the centigrade scale.

EXAMPLE 1

(A)

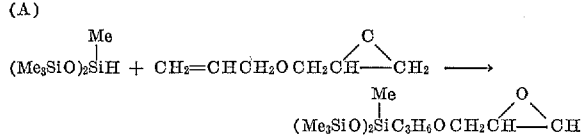

Into a 500 ml. flask 222.5 grams (1.0 mole) of heptamethyl-2-hydrotrisiloxane were added and heated to 100° C. while stirring. To the hot silicone fluid, 125.4 grams (1.1 moles) of allylglycidyl ether (to which 10 drops of chloroplatinic acid, $3 \times 10^{-6}$ mole Pt/drop, had previously been added) were added dropwise and an exothermic reaction ensued. The addition was made over a 30 minute period after which the mixture was heated at 110° C. for 6 hours.

Distillation of the mixture provided 270.0 grams of the product which had a boiling point range of 78–80° C. at 0.12 mm. of mercury and a refractive index of $n_D{}^{25}$=1.4198 confirming the product as gamma-glycidoxypropyl-2-heptamethyltrisiloxane.

(B)

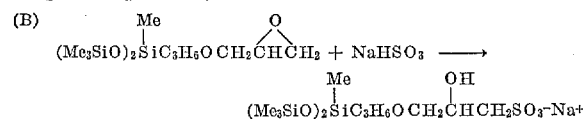

In a 500 ml. flask, 34.3 grams (0.078 mole) of gamma-glycidoxypropyl-2-heptamethyltrisiloxane prepared above, 90 ml. of ethanol (SD–1) and 10 ml. of distilled water were mixed. The resulting mixture was heated to 80° C. while stirring and to it was added dropwise a solution of 10.6 grams (0.102 mole) of sodium bisulfite, 0.45 gram (0.0036 mole, 1.0 wt. percent) of sodium sulfite dissolved in 40 ml. of distilled water. The addition was made dropwise over a 2 hour period in which the mixture became turbid. The mixture was then refluxed for 2 hours. Ethanol was removed by distillation over a 1½ hour period (67 ml. total removed) and then a slightly reduced pressure was applied until most of the solvent was removed and a slurry remained. The slurry was dried by evaporation and was dissolved in 300 ml. of benzene. The solution was filtered and the solvent removed by a constant feed rotary evaporator. The resulting white waxy solid gave the following composition analysis:

Calculated (percent): Carbon, 35.4; hydrogen, 7.5; silicon, 19.0; sulfur, 7.3; sodium, 5.2. Found (percent): Carbon, 35.3; hydrogen, 7.6; silicon, 18.1; sulfur, 6.9; sodium, 4.9.

The product was thus confirmed as

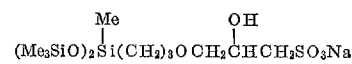

This product was mixed with various organic solvents as listed below in an amount of about 1.0 weight percent based on the solvent. The surface tensions of the resulting mixtures as well as those of each solvent without the product are presented in Table I below. For comparison purposes 1 wt. percent solutions of Bio Soft D–60, an alkyl aryl sodium sulfonate sold by Stepan Chemical Company, in various solvents as listed in Table I below were prepared and the surface tension of each resulting solution was measured and is presented in the last column of Table I.

TABLE I

| Solvent | Actual Surf. Ten. at 25° C. (dynes/cm.) | Surface Tensions (dynes/cm. at 25° C.) in Organic Solvents | | |
|---|---|---|---|---|
| | | Product | Observation Product Solutions | Bio-Soft D–60 |
| Benzene | 28.3 | 25.1 | Clear | 26.5 |
| Toluene | 28.4 | 25.1 | ____do____ | 28.9 |
| Xylene | 28.2 | 24.9 | ____do____ | 28.1 |
| Chloroform | 29.8 | 25.9 | ____do____ | 29.2 |
| Ethylacetate | 25.5 | 22.4 | Turbid | 24.7 |
| Tetrahydrofuran | 26.4 | 24.5 | ____do____ | |
| Dimethylformamide | 35.2 | 29.2 | Product only slightly soluble. | 38.1 |

The product was mixed with water in varying proportions as shown in Table II below. The surface tensions were measured and are set forth in Table II.

TABLE II

| Concentration of Product (weight percent) | Surface Tensions in Water Surface Tension at 23° C. (dynes/cm.) | Observations |
|---|---|---|
| 1 | 20.0 | Turbid. |
| 0.1 | 21.3 | Slightly Trubid. |
| 0.05 | 21.4 | Clear. |
| 0.025 | 23.0 | Do. |
| 0.010 | 25.3 | Do. |
| 0.005 | 28.6 | Do. |
| 0.001 | 46.3 | Do. |

The product when mixed in water in amounts of about 1 wt. percent formed stable foams. The product emulsified benzene-water mixtures when used in amounts of about 1 wt. percent based on the total weight of water and benzene. Moreover, 1 wt. percent aqueous solutions of the product wet polyethylene to a much greater extent than 1 wt. percent aqueous solutions of sodium dodecylbenzene sulfonate.

Two aqueous solutions each containing 0.5 wt. percent of the product were prepared. One was buffered to pH 3 and the other to pH 7. Both were allowed to stand at 25° C. and periodically aliquots were taken from each. The pH 7 solution after 246 hours (10.25 days) was essentially free of degradation products and retained its substantially full initial surfactant capability. The pH 3 solution, however, had formed hexamethyldisiloxane corresponding to a 63% loss of surfactant capability, formed a separate oil phase and would not foam. Similar results can be expected when the pH is maintained at 10.

EXAMPLE 2

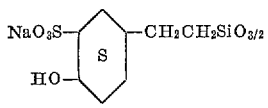

In 200 ml. of a 1:1 (weight ratio) mixture of ethanol in water were dissolved 49.2 grams (0.2 mole) of beta-3,4-epoxycyclohexylethyltrimethoxysilane,

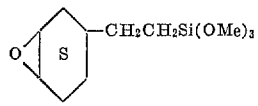

and 20.8 grams (0.2 mole) of sodium bisulfite. After refluxing for 3 hours the mixture was allowed to cool overnight. The solvents were stripped under vacuum to give a grindable white solid having the formula:

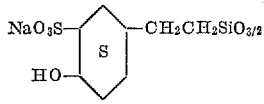

A 1 wt. percent aqueous solution of this product lowered the surface tension of water to 57 dynes/cm.

EXAMPLE 3

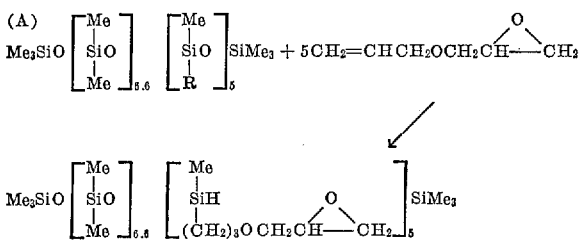

In a 500 ml. flask, 169.4 grams (about 0.885 mole SiH) of hydrosiloxane fluid having the average formula given above were added and heated, while stirring, to 110° C. This temperature was maintained and 101.2 grams (0.89 mole) of allyl glycidyl ether (to which 10 drops of chloroplatinic acid, $3 \times 10^{-6}$ mole Pt/drop, had previously been added) were added dropwise. The addition was made over a 30 minute period after which the mixture was heated at 110° C. for six hours. Silanic hydrogen content was checked by infrared spectrographic analysis. When only trace amounts were detected, the reaction was considered to be complete. The resulting fluid was treated with 4.0 grams of activated charcoal and filtered with nitrogen pressure (10 p.s.i. absolute) and a $\frac{1}{100}\mu$ filter pad. The filtrate was then stripped of lights under a reduced pressure of 5 mm. Hg at 120° C. These were 255.2 grams of product collected which was found to have a refractive index of 1.4363 at 25° C. The product was a liquid with a slight brown tint having the following elemental and oxirane analysis:

Calculated (percent): Carbon, 42.8; hydrogen, 8.4; silicon, 25.1; oxirane, 13.1. Found (percent): Carbon, 41.3; hydrogen, 8.5; silicon, 25.6; oxirane, 12.0.

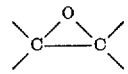

This analysis confirmed the product to be substantially that product shown in the above equation.

(B)
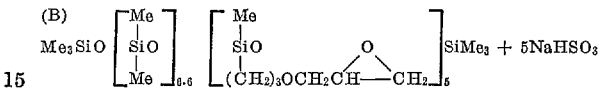

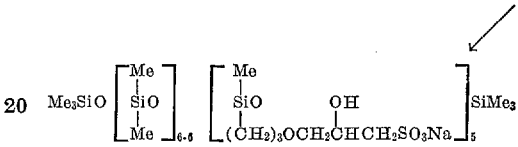

Into a 3 neck 500 ml. flask were placed 32.6 grams [1]

---
[1] This weight is based on the found oxirane content of 12.0%. The weight based on the theoretical oxirane content of 13.1% would be about 30.6 grams.

(containing about 0.1 mole oxirane rings) of the epoxy silicon composition prepared in part A above, 90 ml. of ethanol (SD–1) and 10 ml. of distilled water. The mixture was heated, while stirring, to 75° C. From an addition funnel there was added dropwise an aqueous solution of 11.5 grams (0.11 mole) of sodium bisulfite and 0.44 gram (0.0035 mole, 1.0 wt. percent) sodium sulfite which had previously been dissolved in 40 ml. of distilled water. The addition was made over a one hour period after which the mixture was turbid and inorganic insoluble salts were visible. The mixture was refluxed overnight (18 hours) after which very little insoluble material was observed. The mixture was stripped of ethanol (60 ml.) followed by constant feed rotary evaporation until 40.0 grams of solids remained. The solid residue was further purified by dissolving it in 400 ml. of chloroform and filtering the resulting solution. Approximately 1 gram of solid material was filtered from the solution. The chloroform was stripped from the solution resulting in 34.1 grams of a solid. Twenty-eight grams of the solid were then put into 200 ml. of ethyl ether and slurried for 15 minutes to remove any unreacted epoxy silicon composition or silicone-glycol by-product. The slurry was filtered and the solids dried to provide 22.0 grams of dried product which was analyzed giving the following results:

Theory (percent): Carbon, 30.8; hydrogen, 6.3; silicon, 18.0; sulfur, 7.6; sodium, 5.5; hydroxyl, 4.0. Found (percent): Carbon, 29.7; hydrogen, 6.7; silicon, 17.7; sulfur, 7.7; sodium, 6.4; hydroxyl, 5.4.

This analysis confirmed the product as substantially that shown in equation B above.

The product was then dissolved in water in amounts sufficient to give the concentrations set forth in Table III below and the surface tension of each solution was measured at 25° C. The results of these measurements are given in Table III.

TABLE III

| Concentration (weight percent) | Surface tension at 25° C. (dynes/cm.) | Observation of solution |
|---|---|---|
| 1 | 26.6 | Turbid. |
| 0.1 | 28.4 | Clear. |
| 0.05 | 31.4 | Do. |
| 0.025 | 33.1 | Do. |
| 0.01 | 47.7 | Do. |

A range of novel silicon sulfonates having the formula:

$Me_3SiO[Me_2SiO]_y[Me(NaO_3SCH_2CH$
$(OH)CH_2OC_3H_6SiO]_zSiMe_3$ wherein y is an integer of 0 to 10 and z is an integer of 1 to 7 are produced by methods similar to those set forth in Examples 1 and 3. For example, one mole of

is reacted with z moles of allyl glycidyl ether in the manner taught in part A of Example 3 to form

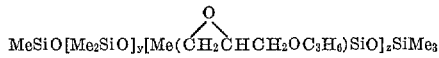

one mole of which then is reacted with 1.1 times z moles of sodium bisulfite in the presence of about 0.035 times z moles of sodium sulfite to form the above-mentioned range of products.

The novel silicon sulfonate compositions are useful alone or together with other wetting agents in making floor cleaners for hardwood floors that are to be refinished. For example, 0.5 part of the product of Example 1, or 2, or 3 is mixed with 4 parts of Tergitol Wetting Agent 7 (25% aqueous solution of sodium sulfate of 3,9-diethyl-tridecanol-6) and stirred to form a gel. Then 95 parts of naphtha are added to form a solution which effectively cleans hardwood floors preparatory to refinishing. When an equal volume of water is added to this solution, there results an emulsion suitable for cleaning metal.

The novel silicon sulfonate compositions are also useful alone or together with other wetting agents in making dry cleaning baths. For example, one part of the product of Example 1, or 2, or 3 is mixed with 61.2 parts oleic acid, 1.8 parts monoethanolamine and 0.75 part sodium nitrite (as rust inhibitor) to form a mixture which is then dissolved in 25.55 parts naphtha. The resulting mixture forms an effective dry cleaning bath. The addition of more water will produce a naphtha-in-water emulsion which is also useful as a dry cleaning bath.

The novel silicon sulfonate compositions are also useful alone or together with other wetting agents in making floor polishes. For example, one part of the product of Example 1, or 2, or 3 is mixed with 40 parts of molten carnauba wax, 4.5 parts of molten oleic acid and 4 parts of triethanolamine. Three parts of borax dissolved in 6 parts of boiling water are added to the resulting mixture and stirred until a clear mixture is obtained. Thereafter, 234 parts of water are added with steady stirring to form a polish emulsion suitable for providing a clear, bright film on linoleum, plastic, and wood floors.

What is claimed is:

1. Process for preparing novel silicon sulfonate compositions comprising reacting, in the presence of a catalytic amount of a sulfite salt, a bisulfite salt having a cation selected from the class consisting of monovalent, divalent and trivalent metal cations, ammonium cation, and tetraalkylammonium cations in which the alkyl substituents have 1 to 18 carbon atoms with an epoxy silicon compound having in an amount of 0.1 to 100 mole percent of epoxy silicon units of the formula:

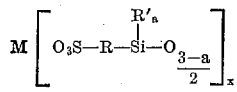 (I)

wherein E' is a monovalent group having 3 to 18 carbon atoms selected from the class consisting of epoxyalkyl, epoxycycloalkyl, epoxyalkoxyalkyl and epoxycycloalkoxyalkyl groups, R' is a monovalent group from the class consisting of alkyl, cycloalkyl, aryl, alkaryl, aralkyl, alkenyl and cycloalkenyl groups and halogen-, alkoxy-, aryloxy- and cyano-substituted derivatives thereof, and a is an integer of 0 to 2 inclusive, and in an amount of 0.0 to 99.9 mole percent of units of the formula:

$$R''_b SiO_{\frac{4-b}{2}}$$ (II)

wherein R'' is a monovalent group selected from the class consisting of hydrogen and a group from the class consisting of groups from which R' is selected and b is an integer of 1 to 3 inclusive; to form said novel silicon sulfonate having in an amount of 0.1 to 100 mole percent the silicon sulfonate units of the formula:

$$M\left[O_3S-R-Si-O_{\frac{3-a}{2}}\right]_x \text{ with } R'_a$$

wherein M is said cation of said bisulfite, R is a hydroxy-substituted divalent group having 3 to 18 carbon atoms selected from the class consisting of alkylene, cycloalkylene, alkyleneoxyalkylene, and cycloalkyleneoxyalkylene groups and said hydroxy substituent is bonded to a carbon atom vicinal to the carbon atom to which the —O₃S— group is bonded, R' is defined above, a is defined above and x is an integer of 1 to 3 inclusive equal to the valency of said cation and in an amount of 0.0 to 99.9 mole percent of units having the Formula II.

2. Process as claimed in claim 1 wherein said epoxy silicon compound is a polysiloxane in which E' is a glycidoxyalkyl group, said cation is selected from the class consisting of sodium, potassium, ammonium and tetraalkyl ammonium in which the alkyl substituents have 1 to 18 carbon atoms, said silicon sulfonate composition is a polysiloxane in which R is a propyleneoxyalkylene group and both said epoxy silicon compound and said silicon sulfonate composition have bonded to respectively said epoxy silicon unit and said silicon sulfonate unit at least one unit of the formula:

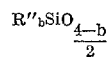

wherein R'' is selected from the class consisting of hydrogen and a monovalent group selected from the class consisting of groups from which R' is selected and b is an integer of 1 to 3 inclusive.

3. Process as claimed in claim 2 wherein said sulfite is sodium sulfite, said bisulfite is sodium bisulfite, said epoxy silicon compound is

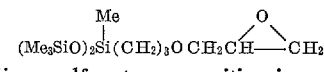

and said silicon sulfonate composition is

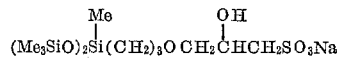

4. Process as claimed in claim 2 wherein said sulfite is sodium sulfite, said bisulfite is sodium bisulfite, said epoxy silicon compound has the average formula:

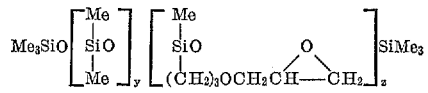

and said epoxy sulfonate composition has the average formula:

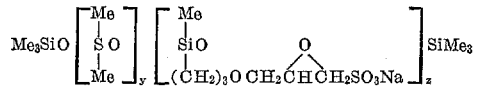

wherein y is an integer of 0 to 10 and z is an integer of 1 to 7.

5. A solvent composition containing at least 0.001% by weight of a polysiloxane containing in an amount of 0.1 to 100 mole percent of silicon sulfonate units having the formula:

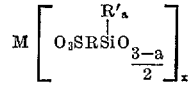

wherein M is a cation selected from the class consisting of monovalent, divalent and trivalent metal cations, ammonium cation, and tetraalkylammonium cations in which the alkyl substituents have 1 to 18 carbon atoms, R' is a monovalent group from the class consisting of alkyl, cycloalkyl, aryl, alkaryl, aralkyl, alkenyl and cycloalkenyl groups and halogen-, alkoxy-, aryloxy- and cyano-substituted derivatives thereof, R is a hydroxy-substituted divalent group having 3 to 18 carbon atoms selected from the class consisting of alkylene, cycloalkylene, alkyleneoxyalkylene, and cycloalkyleneoxyalkylene groups and said hydroxy substituent is bonded to a carbon atom vicinal to the carbon atom to which the —O₃S— group is bonded, $a$ is an integer of 0 to 2 inclusive, and $x$ is an integer of 1 to 3 inclusive equal to the valency of said cation and in an amount of 0.0 to 99.9 mole percent of units of the formula:

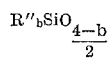

wherein R" is selected from the class consisting of hydrogen and a monovalent group selected from the class consisting of groups from which R' is selected and $b$ is an integer of 1 to 3 inclusive.

6. Solvent composition as claimed in claim 5 wherein said cation is selected from the group consisting of sodium, potassium, ammonium and tetra-alkyl ammonium, the alkyl substituents of which have 1 to 18 carbon atoms.

7. Solvent composition as claimed in claim 6 wherein said solvent is water and the pH of said composition is about 6 to about 8.

8. Solvent composition as claimed in claim 6 wherein said solvent is benzene.

9. Solvent composition as claimed in claim 6 wherein said solvent is toluene.

10. Solvent composition as claimed in claim 6 wherein said solvent is xylene.

11. Solvent composition as claimed in claim 6 wherein said solvent is chloroform.

12. Solvent composition as claimed in claim 6 wherein said polysiloxane is of the formula:

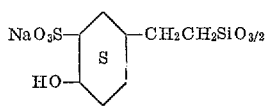

13. Solvent composition as claimed in claim 6 wherein said polysiloxane has the formula:

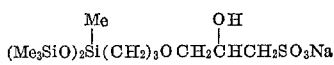

14. Solvent composition as claimed in claim 6 wherein said polysiloxane has the formula:

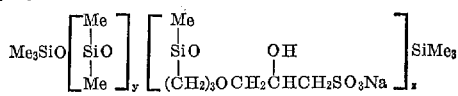

wherein $y$ is an integer of 0 to 10 and $z$ is an integer of 1 to 7.

15. Solvent composition as claimed in claim 13 wherein said solvent is water and the pH is about 6 to about 8.

16. A polysiloxane having in an amount of 0.1 to 100 mole percent of units of the formula:

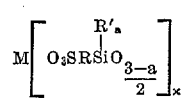

wherein M is a cation selected from the class consisting of monovalent, divalent and trivalent metal cations, ammonium cation, and tetraalkylammonium cations in which the alkyl substituents have 1 to 18 carbon atoms, R' is a monovalent group from the class consisting of alkyl, cycloalkyl, aryl, alkaryl, aralkyl, alkenyl and cycloalkenyl groups and halogen-, alkoxy-, aryloxy- and cyano-substituted derivatives thereof, R is a hydroxy-substituted divalent group having 3 to 18 carbon atoms selected from the class consisting of alkylene, cycloalkylene, alkyleneoxyalkylene, and cycloalkyleneoxyalkylene groups and said hydroxy substituent is bonded to a carbon atom vicinal to the carbon atom to which the —O₃S— group is bonded, $a$ is an integer of 0 to 2 inclusive, and $x$ is an integer of 1 to 3 inclusive equal to the valency of said cation, and in an amount of 0.0 to 99.9 mole percent of units of the formula:

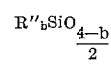

wherein R" is selected from the class consisting of hydrogen and a monovalent group selected from the class consisting of groups from which R' is selected and $b$ is an integer of 1 to 3 inclusive.

17. A polysiloxane as claimed in claim 16 having the formula:

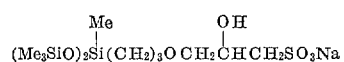

18. A polysiloxane as claimed in claim 16 having the formula:

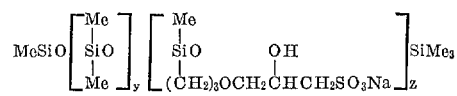

wherein $y$ is an integer of 0 to 10 and $z$ is an integer of 1 to 7.

19. A polysiloxane as claimed in claim 2 having the formula:

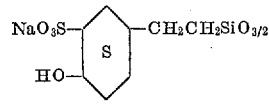

References Cited
UNITED STATES PATENTS

| | | | |
|---|---|---|---|
| 2,968,643 | 1/1961 | Bailey | 260—448.2 X |
| 3,141,898 | 7/1964 | Tiers. | |
| 3,215,643 | 11/1965 | Pail | 260—448.2 X |
| 3,215,718 | 11/1965 | Ryan. | |
| 3,328,449 | 6/1967 | Haluska. | |

DANIEL E. WYMAN, Primary Examiner

P. F. SHAVER, Assistant Examiner

U.S. Cl. X.R.

260—2.5, 429.7, 429.9, 431, 435, 439, 448, 438.1; 252—364, 351; 106—3